US012569014B2

(12) United States Patent
Buckman

(10) Patent No.: US 12,569,014 B2
(45) Date of Patent: Mar. 10, 2026

(54) PORTABLE COOLING DEVICE

(71) Applicant: Michael Allen Buckman, Nespelem, WA (US)

(72) Inventor: Michael Allen Buckman, Nespelem, WA (US)

( * ) Notice: Subject to any disclaimer, the term of this patent is extended or adjusted under 35 U.S.C. 154(b) by 300 days.

(21) Appl. No.: 18/308,361

(22) Filed: Apr. 27, 2023

(65) Prior Publication Data

US 2023/0346053 A1 Nov. 2, 2023

Related U.S. Application Data

(60) Provisional application No. 63/337,022, filed on Apr. 29, 2022.

(51) Int. Cl.

| | |
|---|---|
| *A41D 13/005* | (2006.01) |
| *A01K 13/00* | (2006.01) |
| *A41D 27/28* | (2006.01) |
| *F25B 21/02* | (2006.01) |
| *F25B 21/04* | (2006.01) |
| *H05B 3/14* | (2006.01) |

(52) U.S. Cl.
CPC ........ *A41D 13/0053* (2013.01); *A01K 13/006* (2013.01); *A41D 27/28* (2013.01); *H05B 3/146* (2013.01); *A41D 2400/46* (2013.01); *F25B 21/02* (2013.01); *F25B 21/04* (2013.01); *F25B 2321/02* (2013.01); *F25B 2321/0211* (2013.01); *F25B 2321/0212* (2013.01); *F25B 2321/023* (2013.01); *H05B 2203/036* (2013.01)

(58) Field of Classification Search
None
See application file for complete search history.

(56) References Cited

U.S. PATENT DOCUMENTS

| | | | | |
|---|---|---|---|---|
| 3,085,405 | A | * 4/1963 | Frantti | A62B 17/005 |
| | | | | 607/104 |
| 3,154,926 | A | * 11/1964 | Hirschhorn | F25B 21/04 |
| | | | | 165/172 |
| 4,585,002 | A | * 4/1986 | Kissin | A61F 7/007 |
| | | | | 607/96 |
| 4,930,317 | A | * 6/1990 | Klein | A61F 7/00 |
| | | | | 62/3.5 |

(Continued)

FOREIGN PATENT DOCUMENTS

| | | | | |
|---|---|---|---|---|
| DE | 20018873 | U1 * | 2/2001 | A45C 11/20 |
| DE | 202005008930 | U1 * | 9/2005 | A45C 11/20 |

(Continued)

*Primary Examiner* — Jenna M Maroney

(57) ABSTRACT

A portable system for cooling that is integrated into a wearable garment or carrying device. The device includes a Peltier thermoelectric cooler coupled to the garment. The thermoelectric cooler comprises a cold side plate and a hot side plate. The cold side plate is oriented proximate to the body of the wearer. The cooling device further comprises a thermal shield. The thermal shield comprises a thermally reflective surface that faces the wearer side of the garment. The device comprises a thermal conduction sheet coupled to the cold side of the thermoelectric cooler. The device further comprises a cold pack thermally coupled to a side of the thermal conduction sheet. The device comprises a blower configured to blow air across the hot side of the thermoelectric cooler and away from the garment.

18 Claims, 9 Drawing Sheets

(56) References Cited

U.S. PATENT DOCUMENTS

| | | | | | |
|---|---|---|---|---|---|
| 5,092,129 | A | * | 3/1992 | Bayes | B64G 6/00 |
| | | | | | 62/259.3 |
| 5,655,374 | A | * | 8/1997 | Santilli | A41D 13/1218 |
| | | | | | 2/905 |
| 5,784,890 | A | * | 7/1998 | Polkinghorne | F25B 21/02 |
| | | | | | 165/104.12 |
| 5,800,490 | A | * | 9/1998 | Patz | A61F 7/007 |
| | | | | | 607/108 |
| 6,260,360 | B1 | * | 7/2001 | Wheeler | A01N 1/144 |
| | | | | | 362/371 |
| 6,319,599 | B1 | * | 11/2001 | Buckley | C09K 5/063 |
| | | | | | 36/83 |
| 6,519,948 | B2 | * | 2/2003 | Zorn | F25B 21/02 |
| | | | | | 62/3.62 |
| 6,823,678 | B1 | * | 11/2004 | Li | F25B 21/04 |
| | | | | | 62/3.5 |
| 7,022,093 | B2 | * | 4/2006 | Smith | A61F 7/02 |
| | | | | | 602/14 |
| 7,249,464 | B1 | * | 7/2007 | Watson | F25B 21/02 |
| | | | | | 62/3.2 |
| 7,514,006 | B1 | * | 4/2009 | Lundquist | C02F 1/002 |
| | | | | | 210/780 |
| 8,397,518 | B1 | * | 3/2013 | Vistakula | A61F 7/02 |
| | | | | | 62/3.5 |
| 9,980,526 | B2 | * | 5/2018 | Silverberg | A41D 13/0058 |
| 10,028,550 | B2 | * | 7/2018 | Carbo, Jr. | A43B 7/34 |
| 10,299,525 | B1 | | 5/2019 | Buckman | |
| 10,383,787 | B2 | * | 8/2019 | Rosen | A61H 7/001 |
| 10,842,205 | B2 | * | 11/2020 | Lee | F25D 31/005 |
| 11,602,454 | B1 | * | 3/2023 | Aguiar | A61F 7/007 |
| 11,622,882 | B1 | * | 4/2023 | Weber | A61F 7/0085 |
| | | | | | 607/104 |
| 2005/0193742 | A1 | * | 9/2005 | Arnold | F25B 21/04 |
| | | | | | 62/3.5 |
| 2007/0090135 | A1 | * | 4/2007 | Benham | A45F 3/20 |
| | | | | | 224/148.2 |
| 2008/0046047 | A1 | * | 2/2008 | Jacobs | A61F 7/007 |
| | | | | | 607/108 |
| 2009/0320516 | A1 | * | 12/2009 | Kanagaki | A45C 15/00 |
| | | | | | 224/148.1 |
| 2010/0071395 | A1 | * | 3/2010 | Ledoux | F25D 3/08 |
| | | | | | 62/449 |
| 2013/0087180 | A1 | * | 4/2013 | Stark | H10N 10/13 |
| | | | | | 136/205 |
| 2015/0101788 | A1 | * | 4/2015 | Smith | A61F 7/007 |
| | | | | | 62/3.5 |
| 2015/0208611 | A1 | * | 7/2015 | Russakoff | A01K 13/006 |
| | | | | | 54/79.2 |
| 2016/0206018 | A1 | * | 7/2016 | Barbret | A41D 13/0053 |
| 2018/0110266 | A1 | * | 4/2018 | Lee | A41D 13/0025 |
| 2019/0099288 | A1 | * | 4/2019 | Vergara | F28F 9/18 |
| 2023/0148790 | A1 | * | 5/2023 | Alexander | A47J 27/21083 |
| | | | | | 99/483 |
| 2023/0329902 | A1 | * | 10/2023 | Aguiar | A61F 7/007 |

FOREIGN PATENT DOCUMENTS

| | | | | | | |
|---|---|---|---|---|---|---|
| EP | | 1152199 | A1 | * | 11/2001 | A45C 11/20 |
| GB | | 2202447 | A | * | 9/1988 | A61D 9/00 |
| KR | | 101540477 | B1 | * | 7/2015 | |
| KR | | 20210145526 | A | * | 12/2021 | |
| WO | WO-2008103742 | A2 | * | 8/2008 | A41D 13/005 |
| WO | WO-2017048198 | A1 | * | 3/2017 | A41D 13/0005 |
| WO | WO-2021142129 | A1 | * | 7/2021 | A41D 1/002 |

* cited by examiner

PORTABLE COOLING DEVICE

The current application claims a priority to the U.S. Provisional Patent application Ser. No. 63/337,022 filed on Apr. 29, 2022.

FIELD OF THE INVENTION

The present invention relates generally to a portable device for cooling, in particular a portable device for cooling that is integrated into a wearable garment or carrying device.

BACKGROUND OF THE INVENTION

In many instances, a user may have to complete tasks or endure inclement weather conditions. For instances where the conditions are extremely hot, the wearer may have limited options to protect themselves from the ambient heat and protect their skin from ultraviolet radiation. For example, in extreme heat, a person may have to remove clothing to release internal heat to cool themselves off. Removing those layers of clothing can expose skin, potentially causing exposure to sunburn or ultraviolet radiation. Conversely, adding those layers reduce skin exposure but can raise the temperature and discomfort for the wearer. Accordingly, there is a need for a portable cooling device that can be integrated into a garment while also providing the wearer with the ability to manage the temperature control.

SUMMARY OF THE INVENTION

One objective of the present invention is to provide a portable device for cooling that is integrated into a wearable garment or carrying device. The device can include a garment having a wearer-facing side and a rear facing side. The device can include a thermoelectric cooler. The thermoelectric cooler can be coupled to the garment. The thermoelectric cooler can comprise a cold side plate and a hot side plate. The cold side plate can be oriented to be proximate to the body of the wearer. The hot side plate can be oriented between the cold side plate and ambient environment. The cooling device can further comprise a thermal shield. The thermal shield can define an opening wherein the cold side of the thermoelectric cooler is exposed. The thermal shield can comprise a thermally reflective surface that faces the wearer-facing side of the garment. The device can comprise a thermal conduction sheet coupled to the cold side of the thermoelectric cooler. The thermal conduction sheet can also be positioned between the thermal shield and the wearer-facing side of the garment. The device can also comprise a cold pack thermally coupled to a side of the thermal conduction sheet opposite the side of the thermal conduction sheet that is coupled to the cold side of the thermoelectric cooler. The device can comprise a blower coupled to the garment and located adjacent to the hot side of the thermoelectric cooler. The blower can be configured to blow air generated by the hot side of the thermoelectric cooler and away from the garment. The device can also include a power source configured to power the thermoelectric cooler and the blower.

DETAIL DESCRIPTIONS OF THE INVENTION

Figure 1:
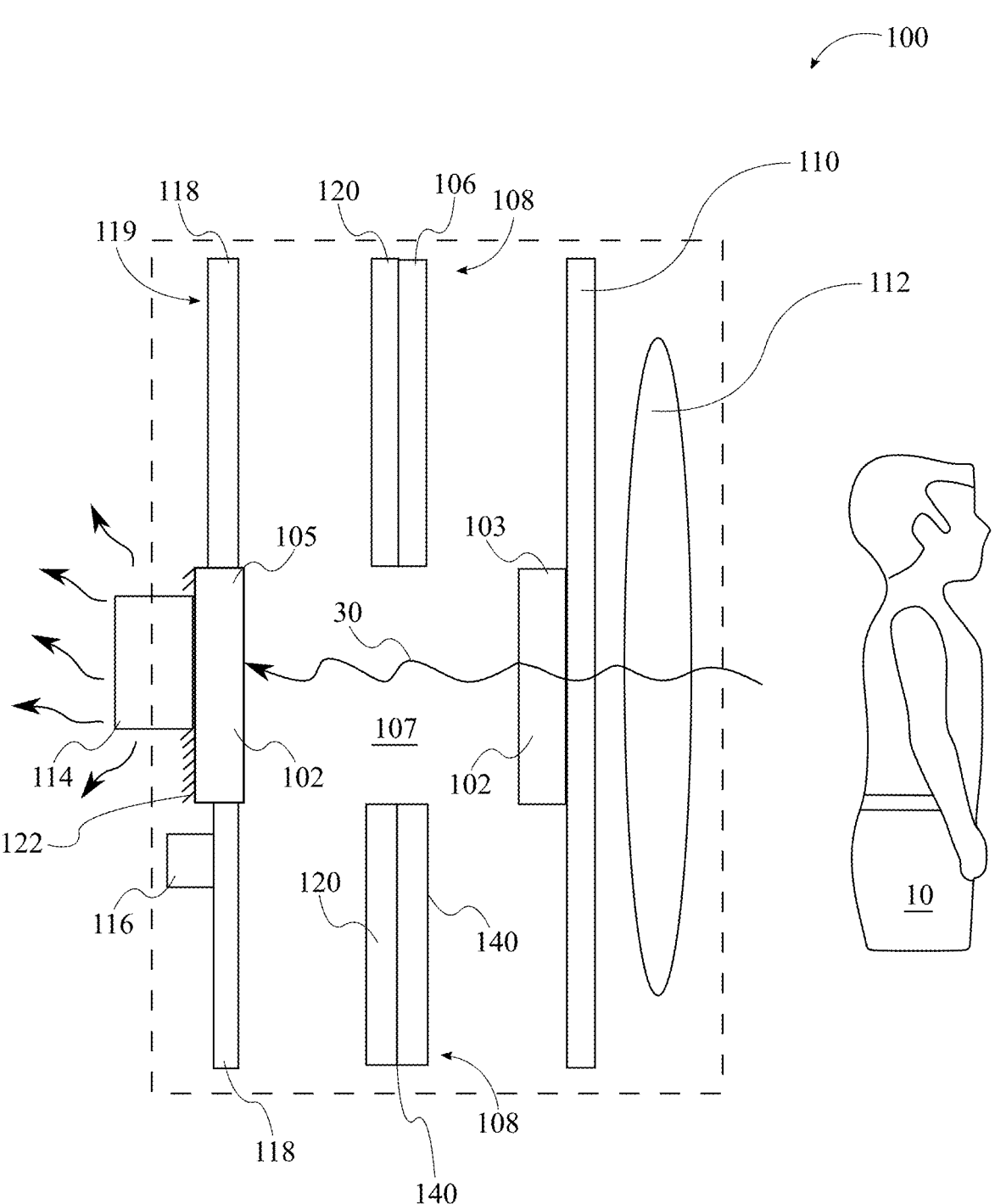
FIG. 1 is an exploded side view of the cooling device.

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual us dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following descrip-
tion to refer to the same or similar elements. While many
embodiments of the disclosure may be described, modifi-
cations, adaptations, and other implementations are possible.
For example, substitutions, additions, or modifications may
be made to the elements illustrated in the drawings, and the
methods described herein may be modified by substituting,
reordering, or adding stages to the disclosed methods.
Accordingly, the following detailed description does not
limit the disclosure. Instead, the proper scope of the disclo-
sure is defined by the appended claims. The present disclo-
sure contains headers. It should be understood that these
headers are used as references and are not to be construed as
limiting upon the subjected matter disclosed under the
header.

Other technical advantages may become readily apparent
to one of ordinary skill in the art after review of the
following figures and description. It should be understood at
the outset that, although exemplary embodiments are illus-
trated in the figures and described below, the principles of
the present disclosure may be implemented using any num-
ber of techniques, whether currently known or not. The
present disclosure should in no way be limited to the
exemplary implementations and techniques illustrated in the
drawings and described below.

Unless otherwise indicated, the drawings are intended to
be read together with the specification, and are to be
considered a portion of the entire written description of this
invention. As used in the following description, the terms
"horizontal", "vertical", "left", "right", "up", "down" and
the like, as well as adjectival and adverbial derivatives
thereof (e.g., "horizontally", "rightwardly", "upwardly",
"radially", etc.), simply refer to the orientation of the illus-
trated structure as the particular drawing figure faces the
reader. Similarly, the terms "inwardly," "outwardly" and
"radially" generally refer to the orientation of a surface
relative to its axis of elongation, or axis of rotation, as
appropriate.

The present disclosure includes many aspects and fea-
tures. Moreover, while many aspects and features relate to,
and are described in the context of a portable cooling device,
embodiments of the present disclosure are not limited to use
only in this context.

As shown in FIG. 1, in the preferred embodiment of the
present invention, the portable cooling device 100 comprises
a plurality of layers. The plurality of layers of the portable
cooling device 100, in the preferred embodiment, are con-
figured to facilitate heat transfer from a wearer 10, while
enabling the wearer 10 to control the temperature and rate of
heat transfer from the garment. In one embodiment of the
present invention, the plurality of layers is composed of a
material, wherein said layers of material are coupled with
fasteners. In the preferred embodiment of the present inven-
tion, the material comprises a windproof material. In alter-
native embodiments of the present invention, the material
comprises a waterproof material. In an embodiment wherein
the material comprises a waterproof material, said material
is a material that is not water permeable. In embodiments
wherein the material comprises a windproof material, said
material is not permeable by airflow from an exterior source,
for example wind. In the preferred embodiment of the
present invention, the fasteners comprise mechanical fas-
teners including screws. In alternative embodiments of the
present invention, the plurality of layers of material are
chemically bonded together. In the preferred embodiment of
the present invention, the cooling device 100 comprises a
thermoelectric cooler 102. The thermoelectric cooler 102 of the present invention, in some embodiments, is a thermo-
electric cooling device 100 that utilizes the Peltier effect to
transfer heat throughout the system. In one embodiment of
the present invention, the thermoelectric cooler 102 com-
prises a plurality of plates 103, 105. In the preferred embodi-
ment of the present invention, the thermoelectric cooler 102
comprises two plates 103, 105 composed of a metallic
material. In said embodiment, one plate is referred to as a
cold side plate 103 herein, and the other plate is a hot side
plate 105, as referred to herein. Under the Peltier effect, the
thermoelectric cooler 102, an electric current causes a trans-
fer of heat to flow from the cold side plate 103 to the hot side
plate 105. The cold side plate 103, in the preferred embodi-
ment of the present invention, is adjacent to a wearer 10. The
wearer 10, as referred to herein, is an individual using (a
user) the present invention. When the heat flows from the
wearer 10, a cooling sensation is produced. The thermoelec-
tric cooler 102 comprises an electrical energy supply,
wherein said electrical energy supply is a power source 116,
such as a battery 116. In an alternative embodiment, the
cooling device 100 comprises a plurality of thermoelectric
coolers 102, thus increasing the rate of heat transfer.

In the preferred embodiment of the present invention, heat
flows from the cold plate to the hot plate and is dissipated
into an ambient environment via a blower 114. In an
additional embodiment of the present invention, the hot
plate comprises a surface, wherein said surface is exposed to
the ambient environment. Furthermore, in some embodi-
ments of the present invention, the surface of the hot plate,
wherein said surface is exposed to the ambient environment,
comprises a plurality of fins 122. The plurality of fins 122
increases the surface area of the hot plate allowing for
additional dissipation of heat into the ambient environment.
In the preferred embodiment of the present invention, the
blower 114 is an electrical fan comprising blades. In the
aforementioned embodiment of the present invention, the
blades of the fan are configured to expel air heated by the hot
plate into the ambient environment surrounding the cooling
device 100. In some embodiments of the present invention
the blower 114 is configured to operate on direct electrical
current parentheses (DC). In an alternative embodiment of
the present invention, the blower 114 is configured for
bidirectional air flow through the cooling device 100. In
some embodiments wherein the blower 114 is configured for
bidirectional air flow, the blower 114 is configured to rotate
in both counterclockwise and clockwise directions. Further-
more, in some embodiments of the present invention the
blower 114 operates under variable speeds to adjust the rate
at which heat is dissipated into the ambient environment.

In the preferred embodiment of the present invention, the
cooling device 100 further comprises a thermal shield 106.
In one embodiment of the present invention, the thermal
shield 106 is composed of a material such as aluminized
fiberglass. Alternatively, in some embodiments of the pres-
ent invention, the thermal shield 106 is composed of a high
temperature silicone, a heat blocking and heat resistant
plastic, or combinations thereof. In alternative embodiments
of the present invention, the thermal shield 106 comprises an
opening. The opening provides space for a portion of the
thermoelectric cooler 102, including at least the cold plate,
to pass through the thermal shield 106 and contact a thermal
conduction sheet 110. The thermal conduction sheet 110,
also referred to as the thermal sheet 110, and some embodi-
ments of the present invention, comprises a thermally reflec-
tive surface 108, facing the wearer-side of the garment. In
the preferred embodiment of the present invention, the
thermal conduction sheet 110 is selected from a material that is rigid or flexible. The thermally reflective surface 108, in some embodiments of the present invention, comprises a film configured to reflect the heat such as aluminate.

In the preferred embodiment of the present invention, the cooling device 100 further comprises a thermal conduction sheet 110. The thermal conduction sheet 110, in the preferred embodiment of the present invention, is coupled to the cold side 103 of the thermoelectric cooler 102. In some embodiments of the present invention, the thermal conduction sheet 110 is positioned interposed between the thermal shield 106 and the wearer-facing side of the garment. The thermal conduction sheet 110, in some embodiments of the present invention, is used to increase the surface area of the cold side 103, and thus increasing the cooling sensation of the cooling device 100. The thermal conduction sheet 110 is composed of a material having a high thermal conductivity, such as aluminum sheets, including but not limited to flexible aluminum films with an adhesive. Furthermore, the thermal shield 106 may, in some embodiments, comprise aluminized fiberglass. The thermal shield 106 may comprise a layer of thermal insulation 120. The layer of thermal insulation 120 is coupled to the side of the thermal shield 106 opposite the thermally reflective surface 108. In an alternative embodiment of the present invention, the cooling device 100 comprises a second thermal shield 118. The second thermal shield 118, referred to herein as the supplemental thermal shield 118, is oriented proximate to the hot side plate 105. The supplemental thermal shield 118, in some embodiments of the present invention, comprises a thermally reflective surface 119 facing outwardly from the wearer 10 facing side of the garment. In additional embodiments of the present invention, the supplemental shield may further comprise aluminized fiberglass. Alternatively, in some embodiments of the present invention, the supplemental thermal shield 118 may be composed of a material selected from the list consisting of Rayon, Kevlar, Polyester, silica, ceramic fabrics, and materials of the like.

In an alternative embodiment of the present invention, the cooling device 100 comprises a cold pack 112. The cold pack 112 is thermally coupled to a side of the thermal conduction sheet 110 opposite the side of the thermal conduction sheet 110 coupled to the cold side 103 of the thermoelectric cooler 102. In some embodiments of the present invention the cold pack 112 comprises a container with fluid. The cold pack 112 may be configured to be repetitively accessed, thus removably attached to the garment, for repetitive freezing. In some embodiments, the cold pack 112, is coupled to the garment via a hook and loop fastener. In other embodiments of the present invention, the cold pack 112, is coupled to the garment via a button attachment system. Said button system may comprises a snap button clasp system. Additionally, in some embodiments of the present invention, the cold pack is coupled to the garment via a zipper mechanism. Further, a means for coupling the cold pack 112 to the garment, in some embodiments of the present invention, shall include an adhesive In some embodiments of the present invention, the contents of the cold pack 112 contain a mixture of water, ammonium nitrate, silica gel, or a combination thereof. In some embodiments of the present invention, the cold pack 112 is selected from a group consisting of an ice pack and a temperature changing pack comprising a gel. Although the term "cold pack" has been used in the context of a temperature reducing element, the term "cold pack," as used herein, shall further be interpreted to refer to a temperature changing pack having capabilities to increase temperature as well.

Furthermore, in some embodiments of the present invention, the portable cooling device 100, further comprises a polyimide heating component 140. The polyimide heating component 140 is a flexible polyimide heater plate comprising an adhesive heating film interposed between the thermal shield 106 and the thermal conduction sheet 110. In alternative embodiments of the present invention, the polyimide heating component is a flexible polyimide heater plate comprising an adhesive heating film interposed between the thermal shield 106 and the layer of thermal insulation 120. In some embodiments, said polyimide heating component requires a voltage of at least seven volts.

Figure 2:
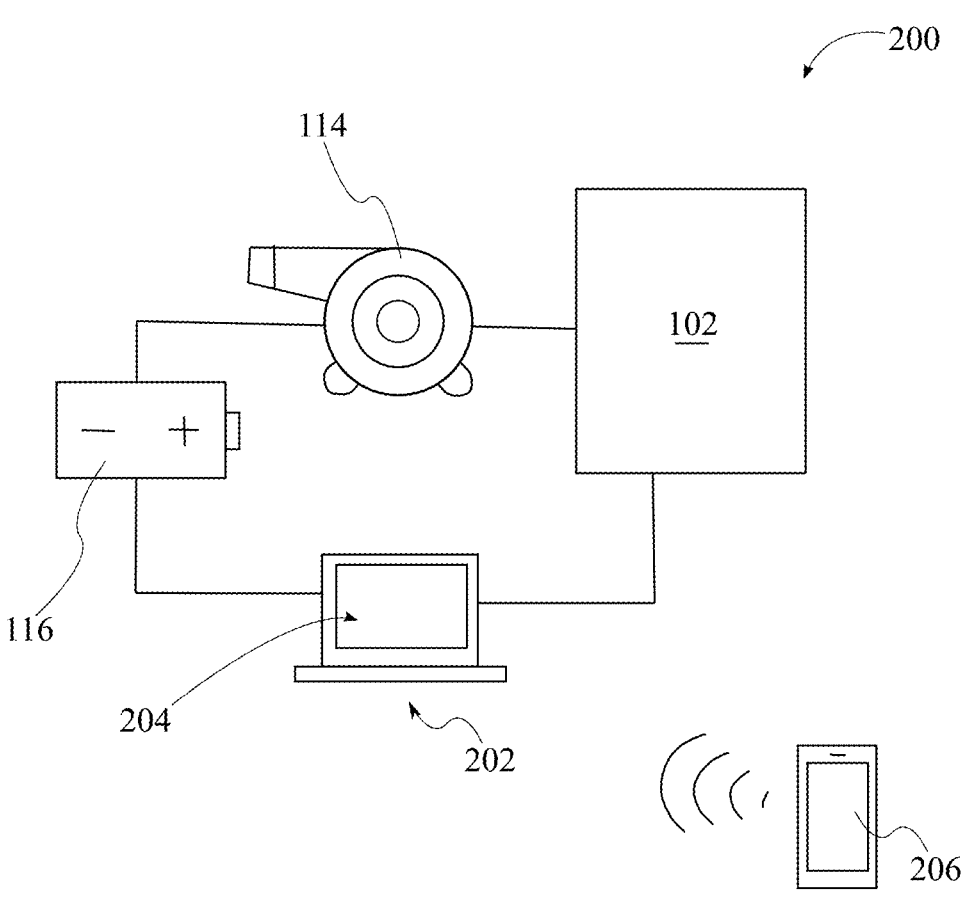
FIG. 2 is an electrical schematic of the cooling device system components.

Additionally, in some embodiments of the present invention, the cooling device 100 further comprises a plurality of electrically coupled components in a circuit 200, as shown in FIG. 2. In one embodiment of the present invention, the circuit 200 is a direct current (DC) electrical circuit 200. The circuit 200 comprises a power source 116, wherein said power source 116 is a battery 116. In some embodiments, the battery 116 comprises the capacity to be recharged. In some embodiments, the power source 116 is in electrical communication with the blower 114. The circuit 200 further comprises the thermoelectric cooler 102 and a controller 202. The controller 202 being configured to regulate the operation of the circuit 200 via a machine-readable instruction. Furthermore, in alternative embodiments, the circuit 200 comprises a plurality of sensors in communication with each component of the circuit 200 wherein each sensor provides operational data for its respective component to the controller 202. The sensors may include temperature sensors, wherein in some embodiments, the temperature sensors are located on the hot side plate 105, the cold side plate 103, or on the cold pack 112. Data collected by the aforementioned temperature sensors may then be used by the controller 202 to adjust the operation of the thermoelectric cooler 102. In one embodiment, the controller 202 comprises a reverse polarity potentiometer. The reverse polarity potentiometer adjusts the direction of the electrical current, thus said potentiometer is configured to reverse the thermal output of the hot side 105 and the cold side 103 of the thermoelectric cooler 102 in response to a temperature reading from the temperature sensors of the cold side 103 falling below a target temperature.

In further embodiments of the present invention, the controller 202 further comprises a user interface (UI) 204 wherein said UI 204 is a mechanical or graphical user interface. The UI 204 may be used by the wearer 10 to provide user input to the cooling device 100. In some embodiments, the UI 204 comprises at least one of the following including a display screen, a plurality or combination of toggle keys, at least one radio button, at least one knob, at least one switch, or a combination thereof. The aforementioned components provide the wearer 10 with the ability to provide inputs as desired. The inputs provided by the wearer 10 are received by the controller 202. Furthermore, in some embodiments of the present invention, the UI 204 may be configured to display operational parameters regarding the circuit 200 comprising a battery life reading, a system temperature, a blower revolutions per minute (rpm), a polarity of the thermoelectric cooler 102, or a combination thereof. In an additional embodiment of the present invention, the controller 202 comprises the capability to identify circuit 200 integrity by using sensors positioned at various components to identify portions of the circuit 200 that are not providing a signal, thus indicating a damaged component. In an additional alternate embodiment of the present invention, the controller 202 may comprise at least one chosen from the group of a receiver and a transmitter, for sending and receiving external signals to the controller 202. In the aforementioned embodiment, the ability to receive and send external signals allows the cooling device 100 to be operated remotely. In one embodiment of the present invention, the wearer 10 may use a mobile device 206 via near field communication or far field telecommunication, to interface with an application that communicates with the controller 202 of the cooling device 100. Electrical connections between the components of the circuit 200 are exemplary and the description thereof should not be intended to limit the scope of the present invention.

Figure 3:
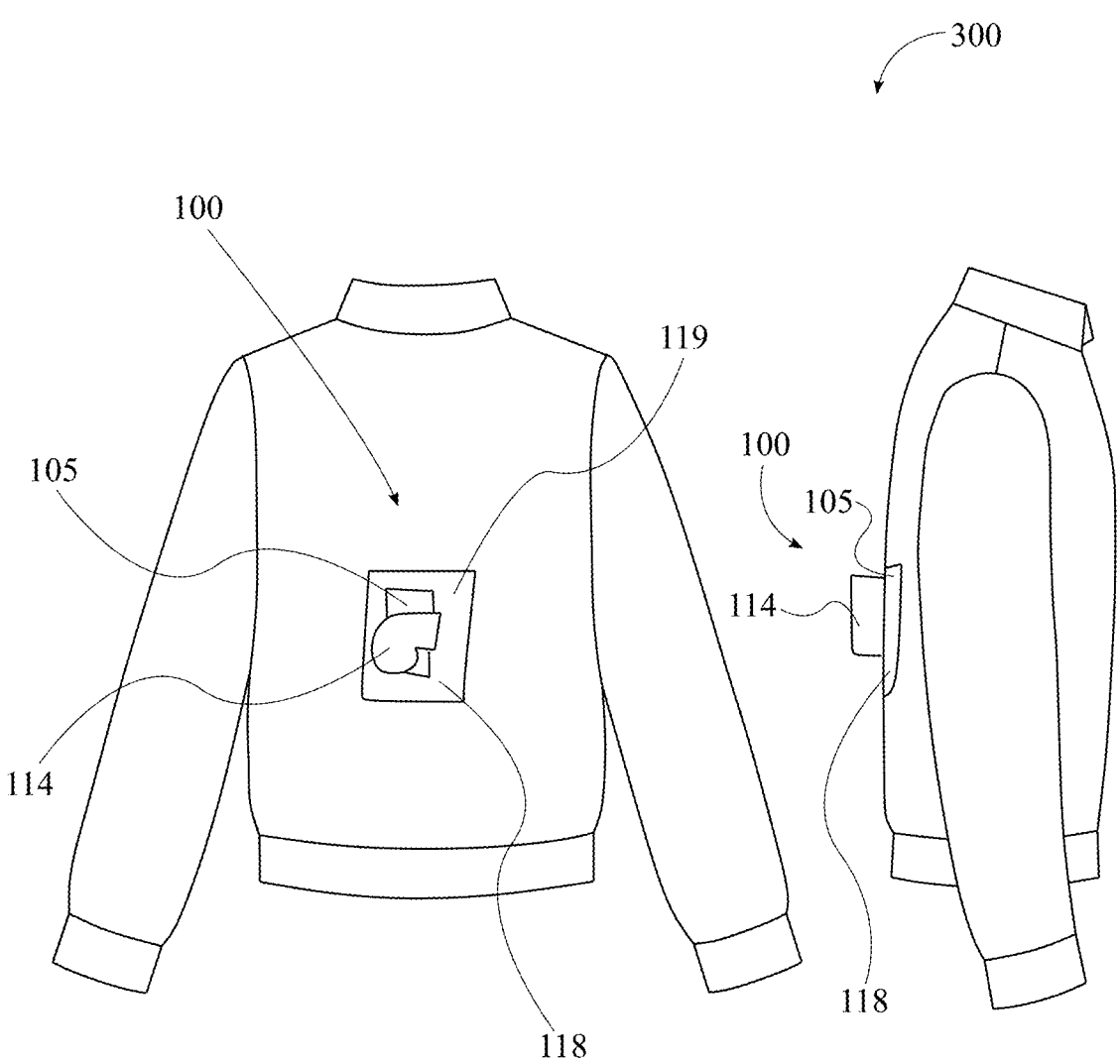
FIG. 3 is a rear view and a side view of the cooling device integrated into a jacket.

As shown in FIG. 3, FIG. 4, FIG. 5, FIG. 6, FIG. 7, and FIG. 8, the cooling device 100 may be integrated into additional environments. In some embodiments, the cooling device 100 may be integrated into various garments including jackets 300, vests, neckwear, belt packs, hand-held air conditioners, and headgear. As shown in FIG. 3, the cooling device 100 may be integrated into a jacket 300. While in use, the cool side plate of the cooling device 100 is adjacent to the back of the wearer 10 when the jacket 300 is being worn by said wearer 10. While the jacket 300 is being worn, the back of the wearer 10 is cooled by the cooling device 100. In other configurations, the jacket 300 further comprises protective elements to aid the wearer 10 from unsafe conditions including reflective materials and neon glow lights. In alternative embodiments, the outwardly facing surfaces of the jacket 300 comprise aluminized fiberglass. The aluminized fiberglass, as stated in the aforementioned embodiment, is used in heat blanks to increase the amount of heat that is dissipated from the body of the wearer 10.

Figure 4:
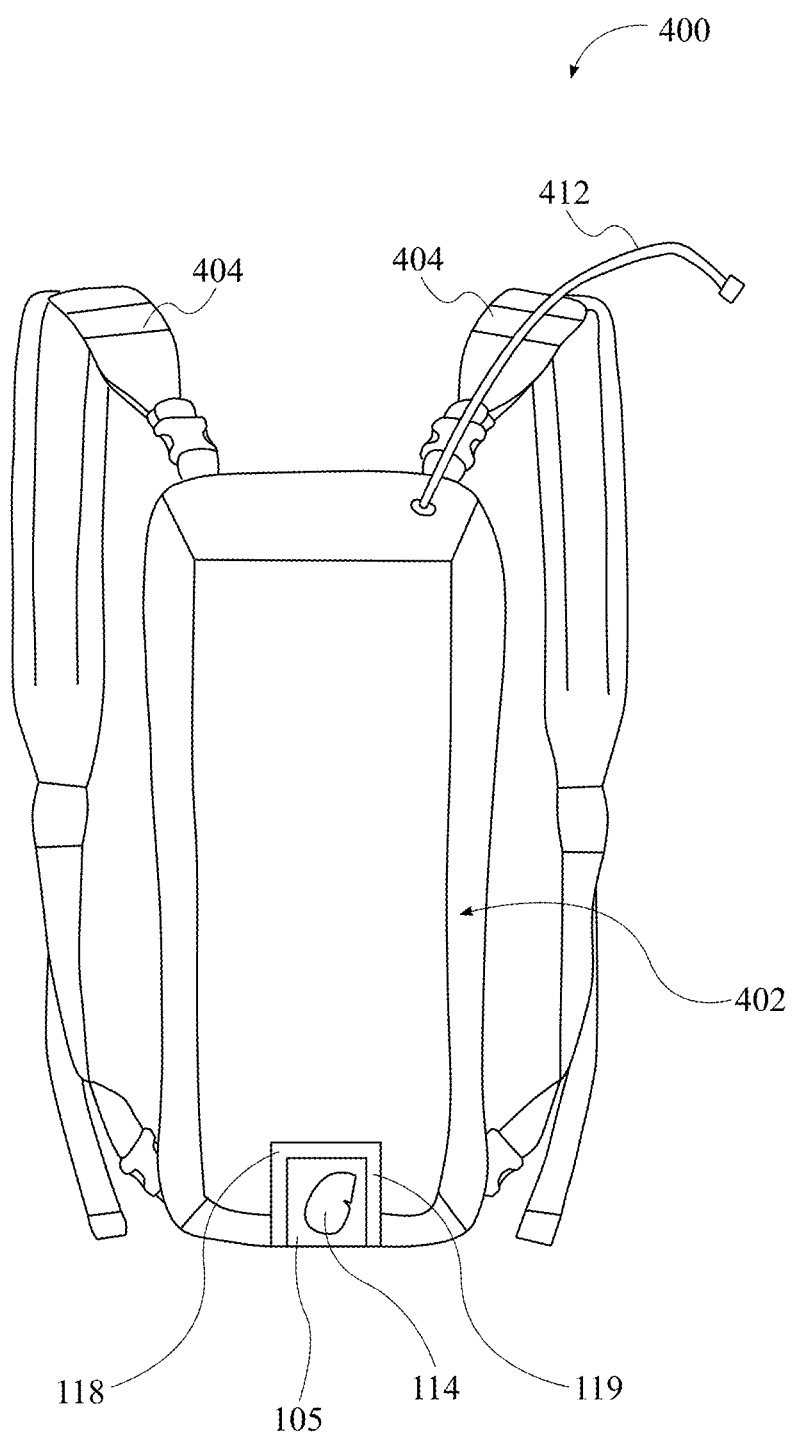
FIG. 4 is a rear view of the cooling device integrated into a backpack.
Figure 5:
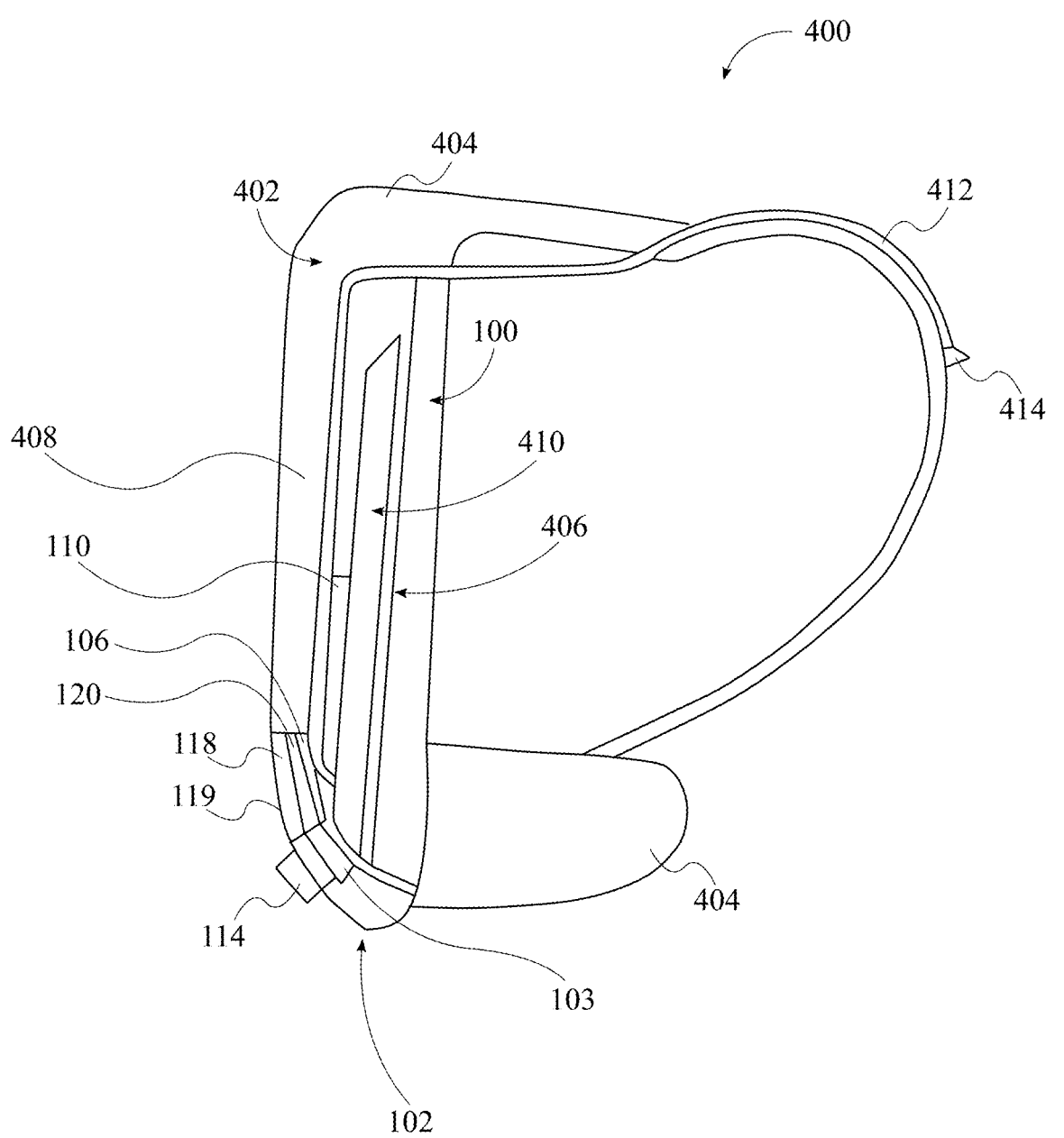
FIG. 5 is a side cross-sectional view of the cooling device integrated into a backpack.
Figure 6:
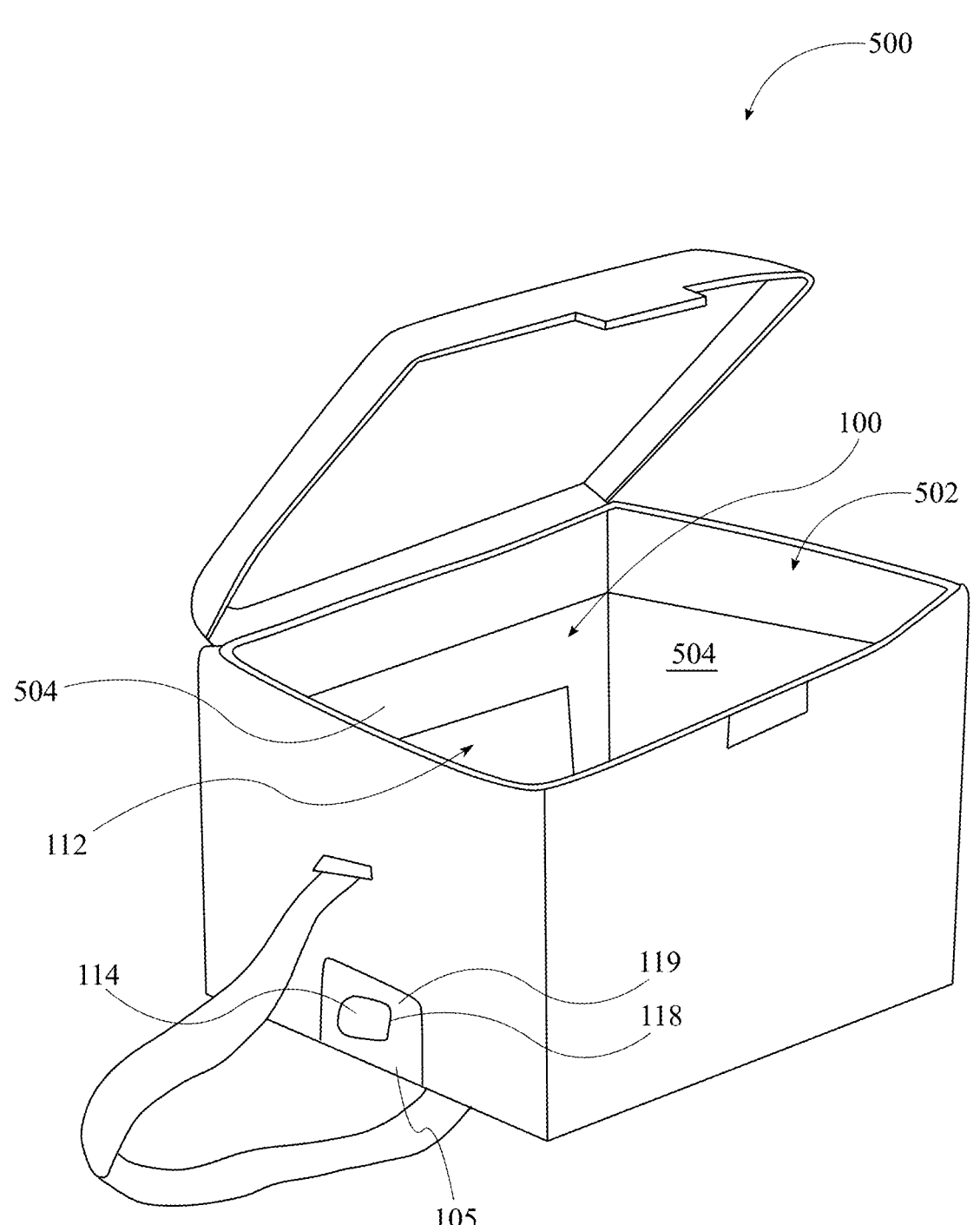
FIG. 6 is an isometric view of the cooling device integrated into a bag.

As shown in FIG. 4 and FIG. 5, the cooling device 100 may also be integrated into a carrying container 400. In one embodiment of the present invention wherein the cooling device 100 is integrated into a carrying container 400, said carrying container 400 may comprise a backpack 400. In the aforementioned embodiment of the present invention wherein the cooling device 100 is integrated into a backpack 400, the backpack 400 comprises a body 402 and at least one support strap 404. The body of the backpack 400 comprises a resealable cavity 408 wherein the wearer 10 can place items such as a food or a beverage container that has the capability to be cooled or regulated at a temperature via the cooling device 100. And an additional embodiment of the bladder 410 present invention, the resealable cavity 408 comprises a hydration pack 406. In the aforementioned embodiment comprising the hydration pack 406, the cold pack 410 comprises a bladder 410 configured for storing the beverage. In an alternative embodiment, the hydration pack 406 comprises a cold pack 410 and a distinct bladder 410 for holding liquids. The hydration pack 406 further comprises tubing 412 wherein said tubing 412 comprises two ends. A first end 413 of the tubing 412 it is coupled to the bladder 410 and extends through and away from the backpack 400 to a second end 414 of the tubing 412. The wearer 10 of the backpack 400 made drink from the second end 414 of the tubing 412. The tubing 412 and the bladder 410 may be composed of materials including rubber, plastic, polymer, metal that is configured to transport a liquid, or a combination thereof. Similarly to the jacket 300, the hot side 105 of the thermoelectric cooler 102 and the blower 114 in the backpack 400 can be exposed to the ambient environment. The blower 114 and the hot side plate 105, and some embodiments of the present invention, are oriented at the bottom of the backpack 400. Alternatively, the blower 114 and the hot side plate 105 may also be oriented at the rear portion of the backpack 400, the region farthest from the body of the wearer 10. To increase the safety utility of the backpack 400, the external surface of the backpack 400 may further comprise lighting features that could be activated by the wearer 10, for example, if the backpack 400 was worn by the wearer 10 at night. Lighting features may include flashing LED lights or light reflective materials to alert drivers if the wearer 10 was a pedestrian. In an alternative embodiment of the present invention, the cooling device 100 is integrated into a garment comprising a bag. The bag comprises a plurality of surfaces. The surfaces of the bag define an insulated cavity 502 configured to carry items of a food and a beverage. The bag, in some embodiments of the present invention, may be used by the user to cool or insulate items that are placed into the insulated cavity 502. In one embodiment of the present invention, the thermal conduction sheet 110 and cold pack 112 extend into a plurality of internal walls 504 of the insulated cavity 502. Alternatively, in one embodiment of the present invention the thermal conduction sheet 110 and the cold pack 112 may be adjacent to the internal walls 504 of the insulated cavity 502. In one embodiment of the present invention, the cold side 103 of the thermoelectric cooler 102 is oriented to be approximate to a sidewall 504 of the bag. In an alternative embodiment of the present invention, the bag comprising the cooling device 100 further comprises a cold pack 112 oriented immediately adjacent to the internal walls 504. To increase the utility of the bag, the bag may further comprise optic fiber lighting to increase visibility into the contents of the bag. In an additional alternative embodiment of the present invention, an ultraviolet light may be integrated into these side balls to further maintain the quality of the contents. In an alternative embodiment, the cooling device 100 comprises a plurality of thermoelectric coolers 102 to increase the rate of heat transfer. In one embodiment, a thermoelectric cooler 102 is integrated into each wall 504 of the bag to increase heat transfer away from the cavity 502.

Figure 7:
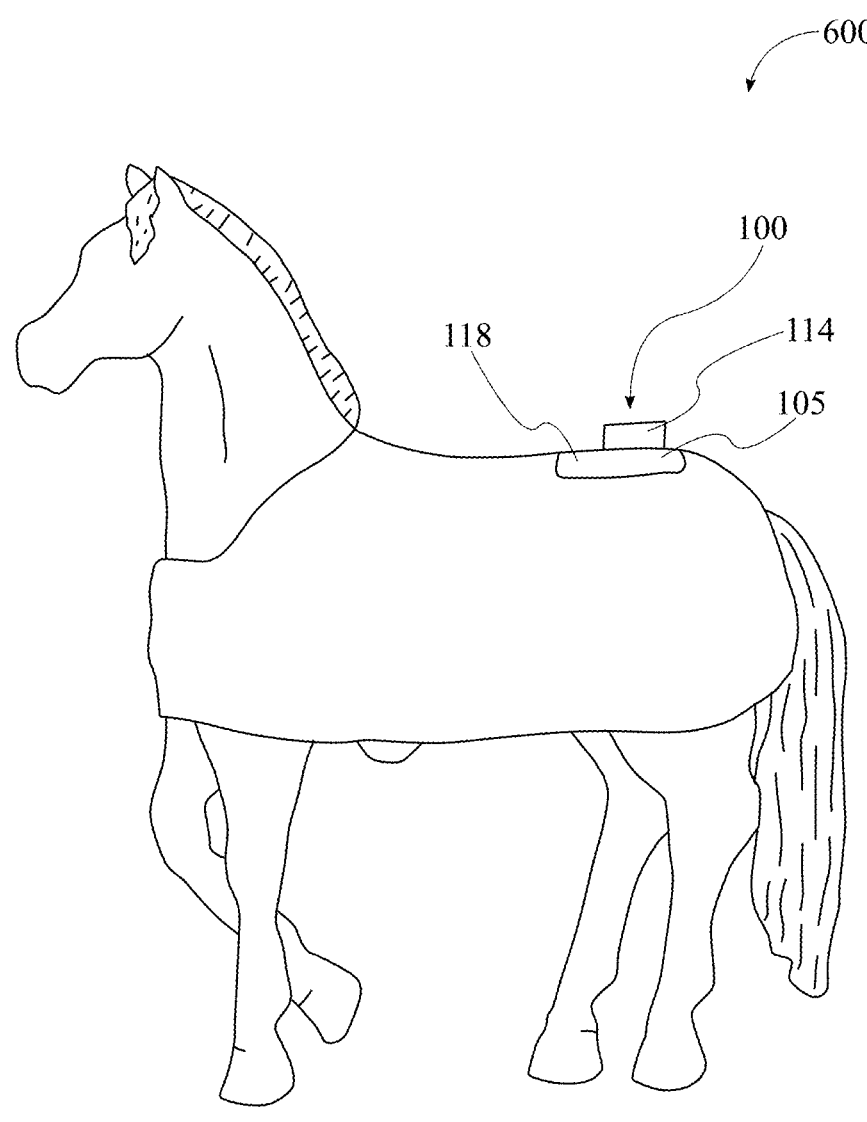
FIG. 7 is a side view of the cooling device integrated into a horse blanket.
Figure 8:
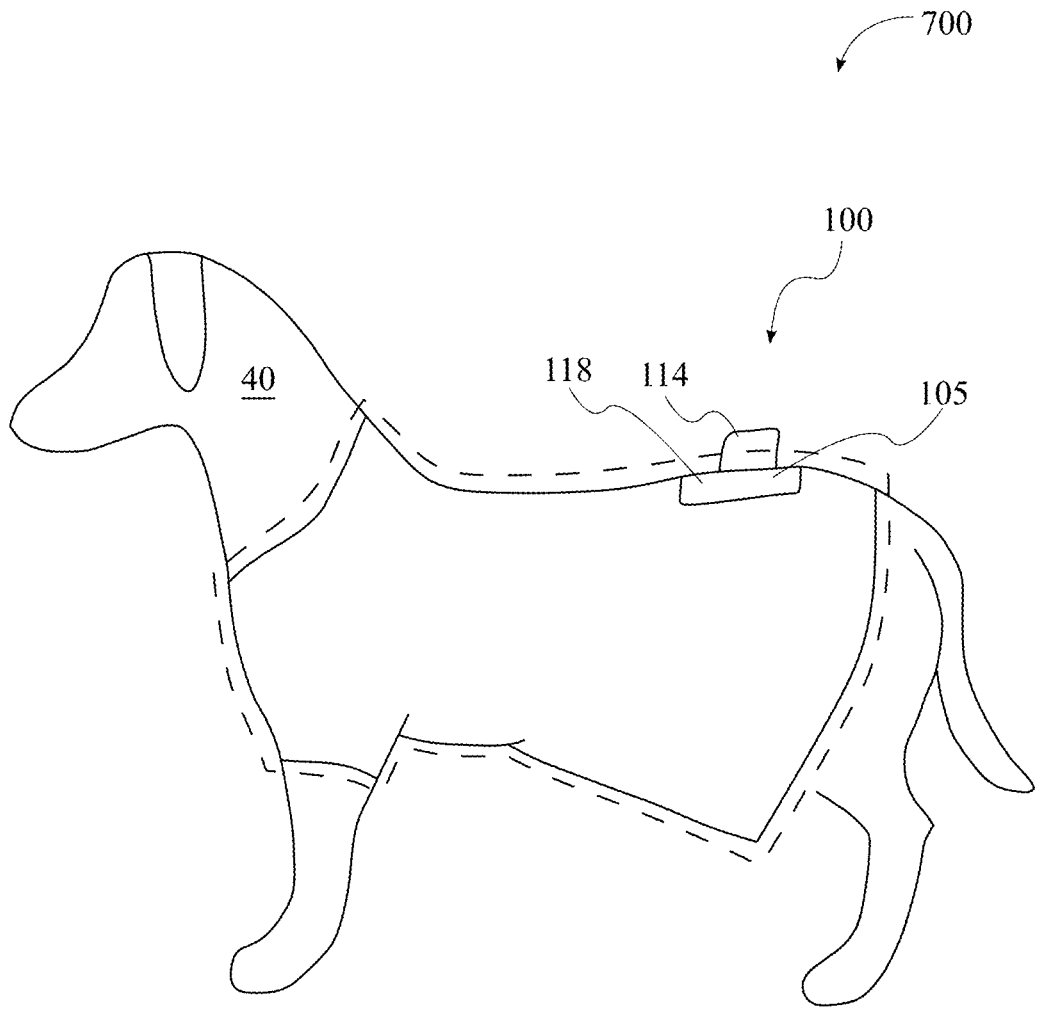
FIG. 8 is a side view of the cooling device integrated into a sweater for a dog.
Figure 9:
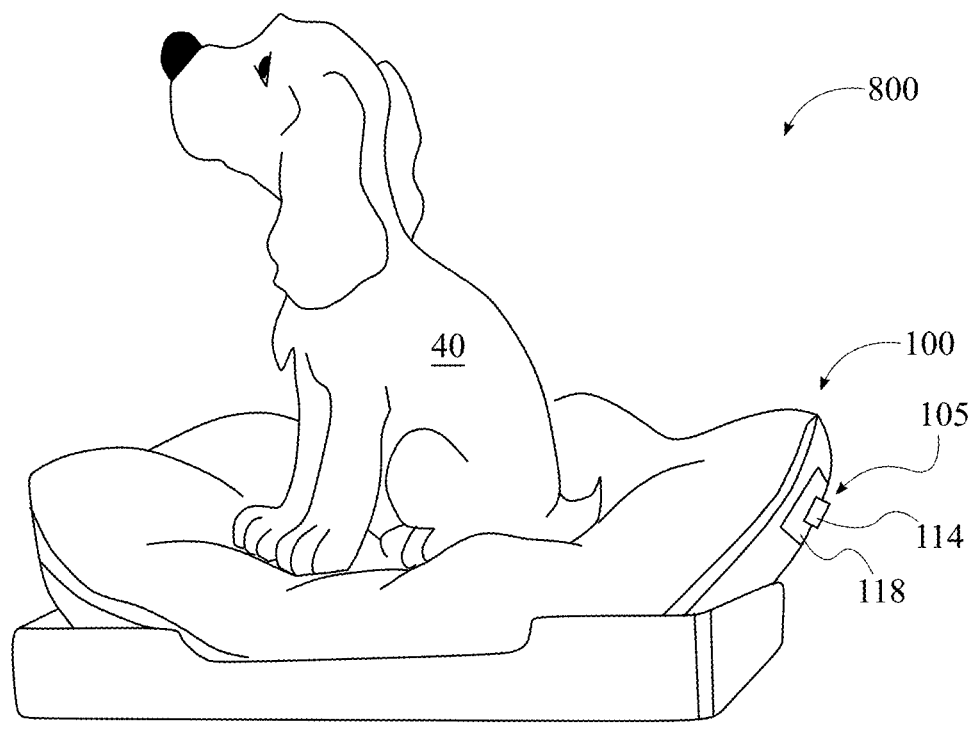
FIG. 9 is an isometric view of the cooling device integrated into the cushioning of a dog bed.

As shown in FIG. 7, FIG. 8, and FIG. 9, the cooling device 100 may further be configured for wearing by an animal 40 comprising 4 legs. In one embodiment the cooling device 100 is integrated into a blanket 600 for an animal 40, as shown in FIG. 7. Furthermore, the cooling device 100 may be integrated into a shawl 700 for an animal 40. In an alternative embodiment of the present invention, the cooling device 100 is integrated into a bed 800 for an animal 40. In the aforementioned exemplary embodiments, the cool side of the thermos electric cooler may be adjacent to the body of the animal 40.

Although the invention has been explained in relation to its preferred embodiment, it is to be understood that many other possible modifications and variations can be made without departing from the spirit and scope of the invention.

What is claimed is:
1. A personal cooling device comprising:
   a garment comprising a wearer-facing side and a rear facing side;
   a thermoelectric cooler coupled to the garment, comprising a cold side positioned proximate the wearer-facing side of the garment, and a hot side;
   a thermal shield comprising an opening therethrough, through which the cold side of the thermoelectric cooler is exposed, wherein the thermal shield has a thermally reflective surface facing the wear-facing side of the garment;
   a thermal conduction sheet coupled to the cold side of the thermoelectric cooler and positioned between the thermal shield and the wearer-facing side of the garment;

a blower coupled to the garment located adjacent the hot side of the thermoelectric cooler configured to blow air across the hot side of the thermoelectric cooler and away from the garment;

a power source configured to power the thermoelectric cooler and the blower;

the garment comprises a bag housing an insulated cavity configured to carry food and drink items; and the thermal conduction sheet extends in a manner that is selected from the group consisting of: into the insulated cavity and adjacent to the insulated cavity.

2. The personal cooling device as claimed in claim 1, further comprising a cold pack removably coupled to a side of the thermal conduction sheet opposite the side of the thermal conduction sheet to the cold side of the thermoelectric cooler.

3. The personal cooling device as claimed in claim 1, comprising a supplemental thermal shield, wherein said supplemental thermal shield comprises a second thermally reflective surface facing away from the wearer-facing side of the garment.

4. The personal cooling device as claimed in claim 1, wherein the thermal shield comprises a layer of thermal insulation coupled to a side of the thermal shield opposite the thermally reflective surface.

5. The personal cooling device as claimed in claim 1, further comprising a controller configured to control the cooling power of the thermoelectric cooler.

6. The personal cooling device of claim 4, further comprising a controller wherein the controller comprises a reverse polarity potentiometer configured to reverse the thermal output of the hot side and the cold side of the thermoelectric cooler in response to a temperature of a cold pack falling below a targeted temperature.

7. The personal cooling device as claimed in claim 4, further comprising a controller wherein the controller is coupled to a user interface configured to enable a user to select a targeted temperature.

8. The personal cooling device as claimed in claim 1, wherein the garment is configured for wearing by an animal with four legs.

9. The personal cooling device as claimed in claim 1, wherein the garment comprises a hydration pack and a cold pack such that the cold pack comprises a bladder configured for storing a beverage, and the hydration pack further comprising tubing coupled to the bladder to enable a wearer of the hydration pack to drink the beverage stored in the bladder.

10. The personal cooling device as claimed in claim 1, wherein the garment comprises a hydration pack and the garment comprises a bladder configured for storing a beverage, the hydration pack further comprising tubing coupled to the bladder to enable a wearer of the hydration pack to drink the beverage stored in the bladder.

11. The personal cooling device as claimed in claim 1, wherein the thermal shield comprises a material selected from the group consisting of aluminized fiberglass, high temperature silicone, a heat resistant plastic, and combinations thereof.

12. The personal cooling device as claimed in claim 1, wherein the thermoelectric cooler is a Peltier thermoelectric cooler.

13. The personal cooling device as claimed in claim 1, wherein an external surface of the hot side of the thermoelectric cooler comprises a plurality of fins.

14. A personal cooling device as claimed in claim 4, further comprising a flexible polyimide heater plate comprising an adhesive heating film interposed between the thermal shield and the layer of thermal insulation.

15. A personal cooling device as claimed in claim 4, further comprising a flexible polyimide heater plate comprising an adhesive heating film interposed between the thermal shield and the thermal conduction sheet.

16. The personal cooling device as claimed in claim 2, wherein the cold pack is removably coupled to the garment by a fastener selected from the group consisting of a hook and loop fastener, a zipper, and a button.

17. The personal cooling device as claimed in claim 14, wherein the polyimide heater requires a voltage of at least seven volts.

18. The personal cooling device as claimed in claim 15, wherein the polyimide heater requires a voltage of at least seven volts.

* * * * *